(12) United States Patent
Subbarao

(10) Patent No.: US 7,743,308 B2
(45) Date of Patent: Jun. 22, 2010

(54) METHOD AND SYSTEM FOR WIRE-SPEED PARITY GENERATION AND DATA REBUILD IN RAID SYSTEMS

(75) Inventor: Sanjay Subbarao, Irvine, CA (US)

(73) Assignee: Adaptec, Inc., Milpitas, CA (US)

( * ) Notice: Subject to any disclaimer, the term of this patent is extended or adjusted under 35 U.S.C. 154(b) by 936 days.

(21) Appl. No.: 11/350,079

(22) Filed: Feb. 9, 2006

(65) Prior Publication Data

US 2006/0179345 A1 Aug. 10, 2006

Related U.S. Application Data

(60) Provisional application No. 60/650,959, filed on Feb. 9, 2005.

(51) Int. Cl.
*G11C 29/00* (2006.01)

(52) U.S. Cl. .................. 714/770; 711/113; 711/114

(58) Field of Classification Search .............. 714/770; 711/113, 114
See application file for complete search history.

(56) References Cited

U.S. PATENT DOCUMENTS

| 5,499,253 | A | * | 3/1996 | Lary | 714/770 |
| 5,923,839 | A | * | 7/1999 | Munetoh et al. | 714/48 |
| 6,070,182 | A | * | 5/2000 | Rao et al. | 708/708 |
| 6,148,368 | A | * | 11/2000 | DeKoning | 711/113 |
| 7,188,270 | B1 | * | 3/2007 | Nanda et al. | 714/6 |
| 7,392,428 | B2 | * | 6/2008 | Forhan et al. | 714/15 |
| 7,406,621 | B2 | * | 7/2008 | Lubbers et al. | 714/6 |
| 2003/0236943 | A1 | * | 12/2003 | Delaney | 711/114 |
| 2005/0060477 | A1 | * | 3/2005 | Wilkins et al. | 710/305 |
| 2005/0223269 | A1 | * | 10/2005 | Stolowitz | 714/6 |
| 2006/0123271 | A1 | * | 6/2006 | Forhan et al. | 714/7 |

* cited by examiner

*Primary Examiner*—Sam Rizk
(74) *Attorney, Agent, or Firm*—Dickstein Shapiro LLP

(57) ABSTRACT

A method and system for generating parity symbols and rebuilding data symbols in a RAID system. The method includes receiving a command to generate a desired parity or data symbol using an XOR relationship between some of a plurality of parity and data symbols. A symbol of the plurality of parity and data symbols is input to an XOR accumulator, the symbol being included in the XOR relationship. Additional symbols of the plurality of parity and data symbols are input to the XOR accumulator. Each time that an additional symbol is input and is included in the XOR relationship, an XOR operation is performed between the symbol in the XOR accumulator and the additional symbol, thus obtaining a resulting symbol that replaces the previous symbol in the XOR accumulator. After every symbol included in the XOR relationship has undergone an XOR operation, the symbol in the XOR accumulator is output as the desired parity or data symbol.

19 Claims, 4 Drawing Sheets

METHOD AND SYSTEM FOR WIRE-SPEED PARITY GENERATION AND DATA REBUILD IN RAID SYSTEMS

CROSS-REFERENCE TO RELATED APPLICATIONS

This application claims the benefit of U.S. Provisional Application Ser. No. 60/650,959, filed Feb. 9, 2005, the entire content of which is incorporated by reference herein.

FIELD OF THE INVENTION

The present invention relates to a networked storage system and, more particularly, to a system for recovering from dual drive failures.

BACKGROUND OF THE INVENTION

With the accelerating growth of Internet and intranet communication, high-bandwidth applications (such as streaming video), and large information databases, the need for networked storage systems has increased dramatically. System performance, data protection, and cost have been some of the main concerns in designing networked storage systems. In the past, many systems have used fibre channel drives, because of their speed and reliability. However, fibre channel drives are also costly. Integrated drive electronics (IDE) drives are much cheaper in terms of dollars per gigabyte of storage; however, their reliability is inferior to that of fibre channel drives. Furthermore, IDE drives require cumbersome 40-pin cable connections and are not easily replaceable when a drive fails. Serial advanced technology attachment (ATA) drives that use the same receptor as their fibre channel counterparts are now available. Serial ATA drives have the speed required for acceptable system performance and are hot-swappable, meaning that failed drives are easily replaced with new ones. Furthermore, they provide more storage than fibre channel drives and at a much lower cost. However, serial ATA drives still do not offer the same reliability as fibre channel drives. Thus, there is an industry push to develop high-capacity storage devices that are low cost and reliable.

To improve data reliability, many computer systems implement a redundant array of independent disks (RAID) system, which is a disk system that includes a collection of multiple disk drives organized into a disk array and managed by a common array controller. The array controller presents the array to the user as one or more virtual disks. Disk arrays are the framework to which RAID functionality is added in functional levels, in order to produce cost-effective, available, high-performance disk systems.

In RAID systems, stored data is distributed over multiple disk drives in order to allow parallel operation to thereby enhance disk access performance and to provide fault tolerance against drive failures. Currently, a variety of RAID levels from RAID level 0 through RAID level 6 have been specified in the industry. RAID levels 1 through 5 provide a single drive fault tolerance. That is, these RAID levels allow reconstruction of the original data if any one of the disk drives fails. It is possible, however, that more than one serial ATA drive may fail in a RAID system. For example, dual drive failures are becoming more common as RAID systems incorporate an increasing number of less expensive disk drives.

To provide, in part, a dual fault tolerance to such failures, the industry has specified a RAID level 6. The RAID 6 architecture is similar to RAID 5, but RAID 6 can overcome the failure of any two disk drives by using an additional parity block for each row (for a storage loss of 2/N, where N represents the total number of disk drives in the system). The first parity block (P) is calculated by performing an exclusive OR (XOR) operation on a set of assigned data chunks. Likewise, the second parity block (Q) is generated by using the XOR function on a set of assigned data chunks. When a pair of disk drives fails, the conventional dual-fault tolerant RAID systems reconstruct the data of the failed drives by using the parity sets. These RAID systems are well known in the art and are amply described, for example, in *The RAIDbook, 6th Edition: A Storage System Technology Handbook*, edited by Paul Massiglia (1997), which is incorporated herein by reference.

An examplary dual parity scheme performs an XOR operation on horizontal rows of drive sectors, in order to generate P parity, and then performs an XOR operation on diagonal patterns of sectors, in order to create Q parity. In general, these systems require a prime number of drives and a prime number of sectors per drive in order to perform. For example, Table 1 shows the process of performing an XOR operation for both the horizontal P parity calculation and the diagonal Q parity calculation in an 11+2 disk configuration, where disk 11 is the P parity disk and disk 12 is the Q parity disk. Note that there are 11 sectors per disk; the number of sectors per disk is equal to the number of data drives.

TABLE 1

Process of performing an XOR operation for both the horizontal P parity calculations and the diagonal Q parity calculation In the example in Table 1, P parity is calculated by performing an XOR operation on the data on sector 0 of disk 0 and the data on sector 0 of disk 1. An XOR operation is further performed on the interim result of the first operation and the data on sector 0 of disk 2 and so on, until the final sector 0 of disk 10 has been processed. The final result is stored in sector 0 of the P parity disk 11 (parity may be rotating and is, therefore, stored in a special row across multiple disks). For the Q parity, an XOR operation is performed on the data on the third sector of drive 0 and the data of the second sector of drive 1. An XOR operation is further performed on the result of the first operation and the first sector of drive 2. The process repeats for the eleventh sector of drive 3, the tenth sector of drive 4, and so on, through the fourth row of drive 10. The final result is stored in the third sector of the Q parity disk 12. This completes an entire diagonal across a prime number of drives, divided into an equal prime number of rows.

An examplary dual parity algorithm is found in U.S. Pat. No. 6,453,428, entitled, "Dual-drive Fault Tolerant Method and System for Assigning Data Chunks to Column Parity Sets." The '428 patent describes a method of and system for assigning data chunks to column parity sets in a dual-drive fault tolerant storage disk drive system that has N disk drives, where N is a prime number. Each of the N disk drives is organized into N chunks, such that the N disk drives are configured as one or more N×N array of chunks. The array has chunks arranged in N rows, from row 1 to row N, and in N columns, from column 1 to column N. Each row includes a plurality of data chunks for storing data, a column parity chunk for storing a column parity set, and a row parity chunk for storing a row parity set. These data chunks are assigned in a predetermined order. The data chunks in each row are assigned to the row parity set. Each column parity set is associated with a set of data chunks in the array, wherein row m is associated with column parity set $Q_m$, where m is an integer that ranges from 1 to N. For row 1 of a selected N×N array, a first data chunk is assigned to a column parity set $Q_i$, wherein i is an integer determined by rounding down (N/2). For each of the remaining data chunks in row 1, each data chunk is assigned to a column parity set $Q_j$, wherein j is an integer one less than the column parity set for the preceding data chunk, and wherein j wraps to N when j is equal to 0. For each of the remaining rows 2 to N of the selected array, a first logical data chunk is assigned to a column parity set $Q_k$, wherein k is one greater than the column parity set for the first logical data chunk in a preceding row, and wherein k wraps to 1 when k is equal to (N+1). For each of the remaining data chunks in rows 2 to N, each data chunk is assigned to a column parity set $Q_n$, wherein n is an integer one less than a column parity set for the preceding data chunk, and wherein n wraps to N when n is equal to 0.

The algorithm described in the '428 patent safeguards against losing data in the event of a dual drive failure. However, performing the algorithm described uses excess processing cycles that may otherwise be utilized for performing system storage tasks. Hence, the '428 patent describes a suitable dual parity algorithm for calculating dual parity and for restoring data from a dual drive failure, yet it fails to provide an optimized hardware system capable of performing the dual parity algorithm without affecting system performance. When one data sector changes, multiple Q parity sectors also need to change. If the data chunk size is equal to one or more sectors, it leads to system inefficiencies for random writes. Because parity calculations operate on an entire sector of data, each sector is read into a buffer. As the calculations continue, it may be necessary to access the buffer several times to reacquire sector data, even if that data had been used previously in the parity generation hardware. There is, therefore, a need for an effective means of calculating parity, such that the storage system is fault tolerant against a dual drive failure, provides optimal performance by improving buffer bandwidth utilization, and is capable of generating parity or regenerating data at wire speed for differing data sector sizes.

Therefore, it is an object of the present invention to provide hardware and software protocols that enable wire speed calculation of dual parity and regenerated data.

It is another object of the present invention to provide a programmable dual parity generator and data regenerator that supports both RAID5 and RAID6 architectures.

It is yet another object of the present invention to provide a programmable dual parity generator and data regenerator that operates independently of stripe size or depth.

It is yet another object of the present invention to provide a programmable dual parity generator and data regenerator that operates independently of sector order (i.e., order in which sectors are read from and written to the buffer).

SUMMARY OF THE INVENTION

In one embodiment of the invention, a method for generating parity symbols and rebuilding data symbols in a RAID system is presented. The method includes first receiving an XOR command packet, the XOR command packet including a command to generate a desired parity or data symbol using an XOR relationship between some of a plurality of parity and data symbols. A symbol of the plurality of parity and data symbols is then input to an XOR accumulator, the symbol being included in the XOR relationship. Additional symbols of the plurality of parity and data symbols are input to the XOR accumulator. Each time that an additional symbol is input and is included in the XOR relationship, an XOR operation is performed between the symbol in the XOR accumulator and the additional symbol, thus obtaining a resulting symbol that replaces the previous symbol in the XOR accumulator. After every symbol included in the XOR relationship has undergone an XOR operation, the symbol in the XOR accumulator is output as the desired parity or data symbol.

Another embodiment of the invention includes an XOR engine for generating a plurality of parity symbols or a plurality of data symbols, the plurality of symbols stored on a plurality of disks in a RAID system, the XOR engine. The XOR engine includes a cache data buffer manager that manages the input and output of the plurality of symbols to and from the XOR engine. The XOR engine also includes a data integrity field engine that verifies whether each of the plurality of symbols input from the cache data buffer manager or output to the cache data buffer manager is in a correct format. Finally, a plurality of multi-accumulators are included. Each of the plurality of multi-accumulators input the plurality of symbols received by the data integrity field engine from the cache data buffer manager and output a plurality of results from a plurality of XOR operations performed on the plurality of symbols. The plurality of results are output to the data integrity field engine and are the generated a plurality of parity symbols or plurality of data symbols.

Yet another embodiment of the invention is a system for generating parity symbols and recovering data symbols in a RAID system. The system includes a plurality of symbols comprised of a plurality of data symbols and a plurality of parity symbols, each of the plurality of symbols stored in a RAID system. The system also includes at least one multi-accumulator that comprises a plurality of XOR accumulators, one XOR accumulator for each disk in the RAID system. Each XOR accumulator is configured to input and hold a symbol from the plurality of symbols and to perform an XOR operation between the held symbol and a subsequently input symbol from the plurality of symbols if both the held symbol and the subsequently input symbol are included in a predefined relationship.

These and other aspects of the invention will be more clearly recognized from the following detailed description of the invention which is provided in connection with the accompanying drawings.

DETAILED DESCRIPTION OF THE INVENTION

Figure 1:
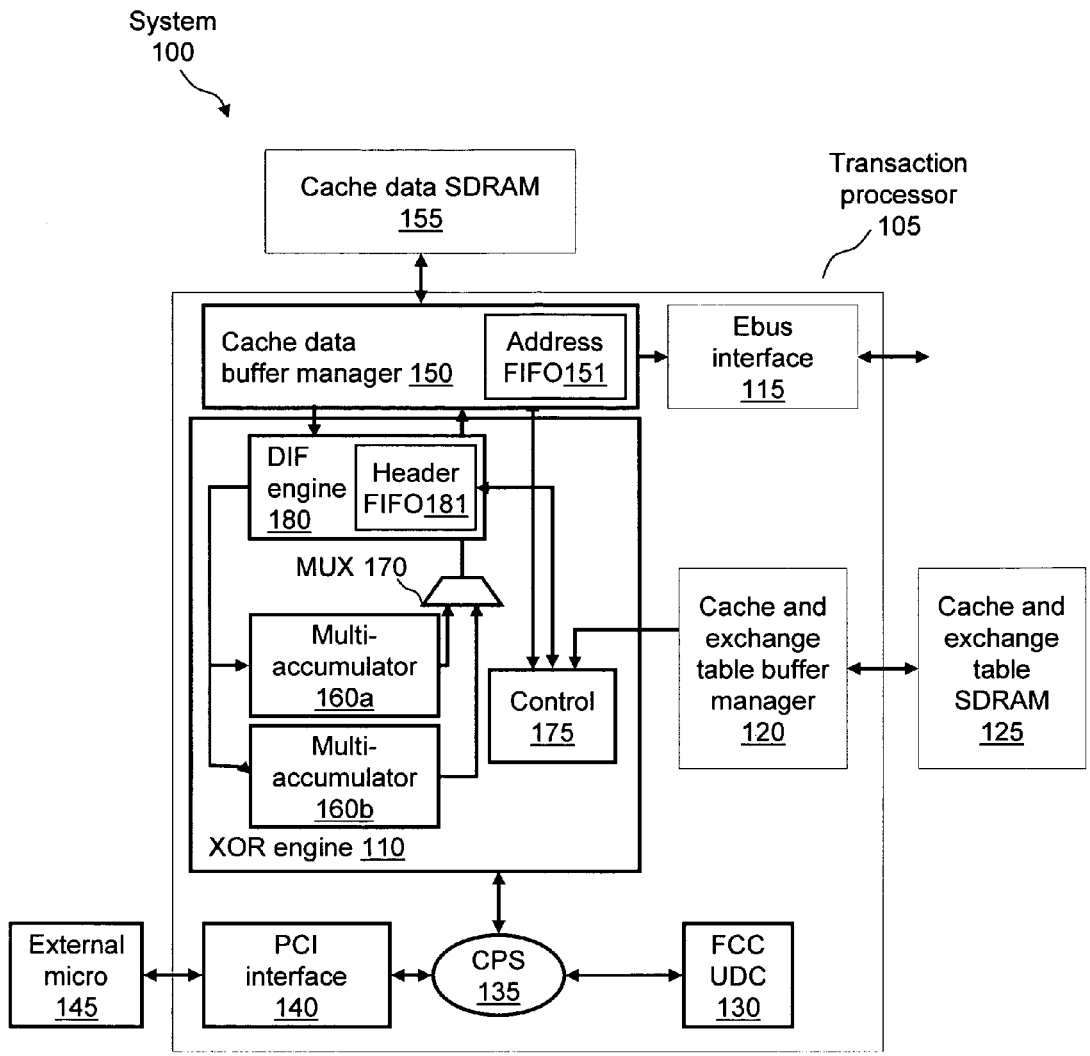
FIG. 1 is a block diagram of a parity generation and data recovery system in accordance with an exemplary embodiment of the invention.

The system of the present invention uses a RAID6 matrix, the generation of which is described in U.S. Patent Application Publication No. 2005/0216787 and U.S. patent application Ser. No. 11/196,409, which are hereby incorporated by reference. The methods of RAID6 matrix generation include a surviving relationships algorithm, such as is described in U.S. Patent Application Publication No. 2005/0216787 or a PDQ algorithm, as is described in U.S. patent application Ser. No. 11/196,409, both of which are run off-line on a separate system and, therefore, have no effect on system performance in the networked storage system. The resulting relationship matrix is used to generate scripts that dictate the controls for the XOR hardware in the networked storage system. These scripts are further described in U.S. patent application Ser. No. 11/196,409, which is hereby incorporated by reference. These scripts are also generated off-line and do not affect system performance.

The present invention is a hardware architecture that uses compact encoding, which is generated from the above-referenced scripts. In a preferred embodiment, the present invention generates the scripts and compact encoding in parallel by improving on the methods described in U.S. Patent Application Publication No. 2005/0216787 and U.S. patent application Ser. No. 11/196,409.

Table 2, shows a RAID6 matrix for an 8+2 configuration. One sector from each storage element D0-D7 participates in the matrix. Each sector is subdivided into eight symbols 0-7 of size 64 bytes. A symbol is represented as D[d,s] where d is the storage element number and s is the symbol number.

are two sets of relationships: the P relationship set and the Q relationship set. P and Q relationships are defined such that for any two drive failure combination, any missing symbols may be recovered by using a sequence of XOR operations on the remaining symbols. The P and Q relationship sets are further described in U.S. Patent Application Publication No. 2005/0216787 and U.S. patent application Ser. No. 11/196,409.

For this invention the following terms are defined:

The term MaxNumDataDrives refers to the maximum number of data drives required for the system specifications.

The term SymbolSize refers to the actual physical size, in bytes, of a symbol. The SymbolSize may be determined by dividing the total number of bytes in a sector, SectorSize, by the MaxNumDataDrives. All symbols in the RAID6 matrix have the same SymbolSize. Hence, the size of a symbol in the P parity sector, P_SymbolSize, or of a symbol in the Q parity sector, Q_SymbolSize, are equal to the value of SymbolSize. For example, in an 8+2 RAID6 matrix where each sector contains 512 bytes (i.e., SectorSize equals 512 bytes), the SymbolSize will equal 512/8, or 64 bytes. Each sector includes as many symbols as are in one column of the RAID6 matrix. As is described below, this enables wire speed implementation of read-modify-write (RMW) parity updates for random writes, because only one P parity sector and one Q parity sector change for each data sector change.

The term MatrixSize refers to the physical size of the RAID6 matrix. MatrixSize is equal to the square of the number of data drives, NumDataDrive, multiplied by the SymbolSize in bytes. MatrixSize also equals the value of NumDataDrives in sectors. For an 8+2 RAID6 example, MatrixSize equals 8 sectors.

The term StripeDepth refers to the number of sectors in a stripe and is defined by the system architecture.

TABLE 2

Example 8 + 2 RAID6 matrix showing P and Q relationship sets, based on PDQ

| | | Drives | | | | | | | | P-ParityDrive | Q-ParityDrive |
|---|---|---|---|---|---|---|---|---|---|---|---|
| | | D0 | D1 | D2 | D3 | D4 | D5 | D6 | D7 | D8 | D9 |
| | 0 | P1,Q1 | P6,Q5 | P2,Q9 | P3,Q9 | P8,Q4 | P6,Q1 | P1,Q4 | P3,Q5 | P3,Q4 | Q2,Q7 |
| | 1 | P2,Q2 | P3,Q2 | P1,Q8 | P2,Q8 | P3,Q8 | P7,Q2 | P3,Q6 | P1,Q3 | P2,Q3 | Q1,Q7 |
| 64 Bytes | 2 | P3,Q3 | P1,Q9 | P3,Q1 | P5,Q2 | P4,Q9 | P2,Q6 | P4,Q7 | P2,Q4 | P1,Q2 | Q3,Q7 |
| Symbols | 3 | P4,Q4 | P2,Q1 | P6,Q4 | P4,Q1 | P6,Q2 | P1,Q5 | P2,Q5 | P5,Q7 | P8,Q9 | Q5,Q7 |
| | 4 | P5,Q5 | P4,Q3 | P5,Q3 | P1,Q7 | P2,Q7 | P3,Q7 | P5,Q8 | P6,Q8 | P7,Q8 | Q6,Q7 |
| | 5 | P6,Q6 | P8,Q7 | P4,Q2 | P6,Q3 | P7,Q3 | P5,Q9 | P7,Q1 | P4,Q6 | P4,Q5 | Q4,Q7 |
| | 6 | P7,Q7 | P5,Q4 | P7,Q5 | P8,Q5 | P1,Q6 | P4,Q8 | P6,Q9 | P7,Q9 | P6,Q7 | Q9,Q7 |
| | 7 | P8,Q8 | P7,Q6 | P8,Q6 | P7,Q4 | P5,Q1 | P8,Q3 | P8,Q2 | P8,Q1 | P5,Q6 | Q8,Q7 |

Symbol D0,0 participates in relationships P1 & Q1

Q1 => D[0,0]^D[1,3]^D[2,2]^D[3,3]^D[4,7]^D[5,0]^D[6,5]^D[7,7]^D[9,1] = 0

A relationship is a set of symbols that XOR to logical '0'. Storage elements D0 through D7 contain data sectors. Drives D8 and D9 contain P and Q parity sectors, respectively. There The term StripeSize refers to the physical size of each stripe. StripeSize is equal to the StripeDepth multiplied by the NumDataDrive. For example, the diagram in Table 3 shows a single stripe on an 8+2 RAID6 system that has a StripeDepth equal to 16 sectors and a StripeSize equal to 16*8, or 128 sectors.

TABLE 3

Example 8 + 2 RAID6 stripe that has a StripeDepth equal to 16 sectors.

| | | | Drives | | | | | | | P-ParityDrive | Q-ParityDrive | |
|---|---|---|---|---|---|---|---|---|---|---|---|---|
| | | D0 | D1 | D2 | D3 | D4 | D5 | D6 | D7 | D8 | D9 | |
| | 1024 | 0 | 16 | 32 | 48 | 64 | 80 | 96 | 112 | 0 | 0 | 0 |
| | 1025 | 1 | 17 | 33 | 49 | 65 | 81 | 97 | 113 | 1 | 1 | 1 |
| | 1026 | 2 | 18 | 34 | 50 | 66 | 82 | 98 | 114 | 2 | 2 | 2 |
| | 1027 | 3 | 19 | 35 | 51 | 67 | 83 | 99 | 115 | 3 | 3 | 3 |
| | 1028 | 4 | 20 | 36 | 52 | 68 | 84 | 100 | 116 | 4 | 4 | 4 |
| | 1029 | 5 | 21 | 37 | 53 | 69 | 85 | 101 | 117 | 5 | 5 | 5 |
| | 1030 | 6 | 22 | 38 | 54 | 70 | 86 | 102 | 118 | 6 | 6 | 6 |
| StripeDepth = 16 sectors / DriveLba | 1031 | 7 | 23 | 39 | 55 | 71 | 87 | 103 | 119 | 7 | 7 | 7 / MatrixNum |
| | 1032 | 8 | 24 | 40 | 56 | 72 | 88 | 104 | 120 | 8 | 8 | 8 |
| | 1033 | 9 | 25 | 41 | 57 | 73 | 89 | 105 | 121 | 9 | 9 | 9 |
| | 1034 | 10 | 26 | 42 | 58 | 74 | 90 | 106 | 122 | 10 | 10 | 10 |
| | 1035 | 11 | 27 | 43 | 59 | 75 | 91 | 107 | 123 | 11 | 11 | 11 |
| | 1036 | 12 | 28 | 44 | 60 | 76 | 92 | 108 | 124 | 12 | 12 | 12 |
| | 1037 | 13 | 29 | 45 | 61 | 77 | 93 | 109 | 125 | 13 | 13 | 13 |
| | 1038 | 14 | 30 | 46 | 62 | 78 | 94 | 110 | 126 | 14 | 14 | 14 |
| | 1039 | 15 | 31 | 47 | 63 | 79 | 95 | 111 | 127 | 15 | 15 | 15 |

Table 3: Example 8+2 RAID6 stripe that has a StripeDepth equal to 16 sectors.

In Table 3, there are 16 1×(8+2) matrices in one stripe. MatrixNum, referring to the index number of each matrix in the stripe, is numbered 0 through 15. Associated with each of the 128 data sectors is a volume logical block address (LBA) and a drive LBA. For this example, matrix number 4 includes data from the drive LBA 1028 for every storage element (assuming all drive partitions participating in this RAID6 virtual drive start at an LBA of 1024). The number inside each box in Table 3 represents a volume LBA. The volume LBA in the P and Q storage elements represents the P_ParityLBA and the Q_ParityLBA respectively. For example, the matrix with MatrixNum equal to 1 includes volume LBAs 1, 17, 33, 49, 65, 81, 97, 113, P_ParityLBA=1, and Q_ParityLBA=1. The symbols that belong to these 10 sectors are in a RAID6 relationship matrix format, as shown in Table 2.

The total number of matrices in a stripe is the StripeDepth. Hence, when indexing the matrices, the MatrixNum is reset to 0 after MatrixNum equals the StripeDepth minus 1.

FIG. 1 is a block diagram of a parity generation and data recovery system 100 in accordance with an embodiment of the invention. System 100 includes a transaction processor 105, which is fully explained in U.S. patent application Ser. No. 10/429,048, hereby included by reference. Transaction processor 105 includes an XOR engine 110, an Ebus interface 115, a cache and exchange table buffer manager 120, which communicates with a cache and exchange table SDRAM 125, a functional control code (FCC) Universal Data Connector (UDC) 130 that communicates to a cross point switch (CPS) 135, which further communicates with a PCI interface 140 and XOR engine 110. An external micro 145 interfaces to transaction processor 105 through PCI interface 140. XOR engine 110 is further connected to a cache data buffer manager 150. Cache data buffer manager 150 includes an address first-in, first-out (FIFO) unit 151 and is connected to a cache data SDRAM 155 and Ebus interface 115.

XOR engine 110 includes a data integrity field (DIF) engine 180 which in turn includes a header FIFO unit 181. XOR engine 110 also includes a multi-accumulator 160*a* and a multi-accumulator 160*b*. Multi-accumulator 160*b* is another instance of multi-accumulator 160*a*. Cache data buffer manager 150 is connected to multi-accumulator 160*a* and multi-accumulator 160*b* via DIF engine 180. Multi-accumulators 160*a* and 160*b* are further connected to a multiplexer (MUX) 170. MUX 170 is further connected to cache data buffer manager 150 via DIF engine 180. XOR engine 110 further includes a control 175, which is connected to cache data buffer manager 150, header FIFO unit 181, and cache and exchange table buffer manager 120.

DIF engine 180 checks for the correct header and cyclic redundancy check (CRC) on incoming data to multi-accumulators 160*a* and 160*b*, strips the headers on incoming data if required by the DIF standard, and checks/inserts appropriate headers on outgoing data from 160*a* and 160*b* to cache SDRAM 155.

The header information consists of a tag field, an LBA type (e.g. PLBA, QLBA, or a non-parity volume LBA, VLBA), and a CRC that may cover either user data only or all data including metadata and user data (depending on the industry or proprietary DIF). A commonly used header for DIF in the storage industry typically includes 8 bytes, including 2 bytes dedicated for a tag field, 4 bytes for an LBA field, and 2 bytes for a CRC field.

Control 175 is also responsible for simultaneously sending header information to header FIFO unit 181 and address information to address FIFO unit 151, corresponding to the relevant sector in cache data SDRAM 155. This ensures that DIF engine 180 receives the header information corresponding to a sector in advance (prior to processing the sector); thereby ensuring that the DIF implementation does not preclude wire speed operation.

The symbol size in the multi-accumulator design is determined by the host sector size only and is independent of DIF implementation details (i.e. whether a host sector includes DIF header information or not). For example, if the host sector includes header information indicating that the SectorSize is 520 bytes, then the SymbolSize for this example will be equal to 520/16 bytes or 32.5 bytes (260 bits). If the host sector does not include the header information, the sector is, by default, 512 bytes and thus the SymbolSize for this example will be 32 bytes (512/16 bytes, or 256 bits).

Figure 2:
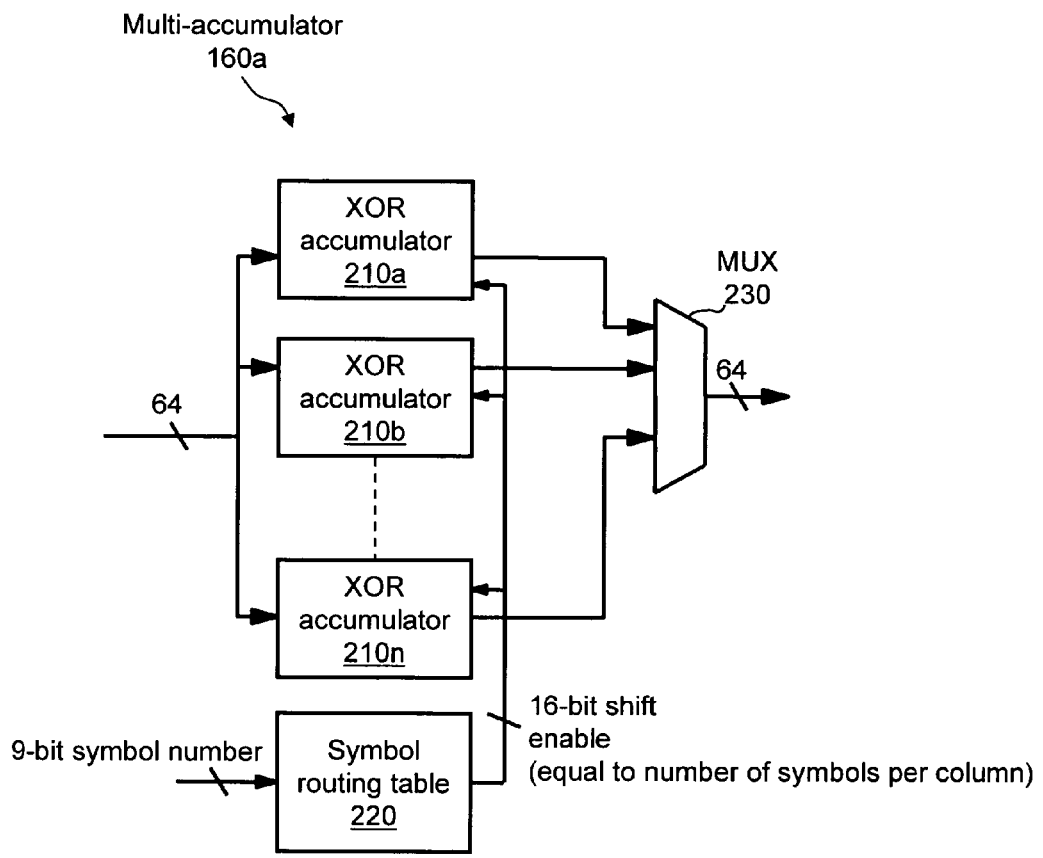
FIG. 2 is a block diagram of a detailed view of a multi-accumulator in accordance with an exemplary embodiment of the invention.

FIG. 2 is a block diagram of a detailed view of multi-accumulator 160a. Multi-accumulator 160a includes multiple XOR accumulators 210 (i.e., 210a and 210b . . . . 210n), a symbol routing table 220 whose output is connected to the shift enable inputs of XOR accumulators 210, and a MUX 230, which is connected to XOR accumulators 210. Symbol routing table 220 includes the compact RAID 6 code. Inputs to XOR accumulators 210 are supplied by cache data buffer manager 150 (FIG. 1). MUX 230 sends output signals to MUX 170 (FIG. 1). XOR accumulators 210 include a plurality of shift register blocks which are described in more detail in reference to FIG. 3.

Symbol routing table 220 includes the compact encoding of a relationship matrix. The following is a description of the contents of symbol routing table 220:

Encoding: each P and Q symbol in the relationship matrix is expressed as an XOR of data symbols only; there are no intermediate terms (similar to the truth table used in Boolean logic design).

Decoding: any missing symbol that corresponds to a failed drive or drives in the RAID6 matrix is expressed as an XOR of the remaining data and parity symbols only; there are no intermediate terms (similar to the truth table used in Boolean logic design).

Symbol routing table 220 includes only one code at a time, either an encoding code or a decoding code. The compact encoding format enables a random XOR sequence order for computing parity or missing symbols and can be used further to represent any other parity-based RAID6 algorithm.

Each location in symbol routing table 220 corresponds to a symbol in the RAID6 matrix. A symbol at a particular location in the matrix (i.e., at a particular ColumnNum and RowNum) is located in symbol routing table 220 as follows: LocationNum, the symbol location in the symbol routing table 220, is set equal to the ColumnNum multiplied by the SymbolsPerColumn plus the RowNum, where the SymbolsPerColumn is equal to the MaxNumDataDrives (16, in this example). The data size at each location is equal to twice the number of symbols per column, or 2*SymbolsPerColumn.

Each bit in the LocationNum corresponds to a symbol in multi-accumulators 160a or 160b which are set to equal one if the symbol at the given location is one of the terms in the XOR equation needed to regenerate the corresponding symbol.

Figure 3:
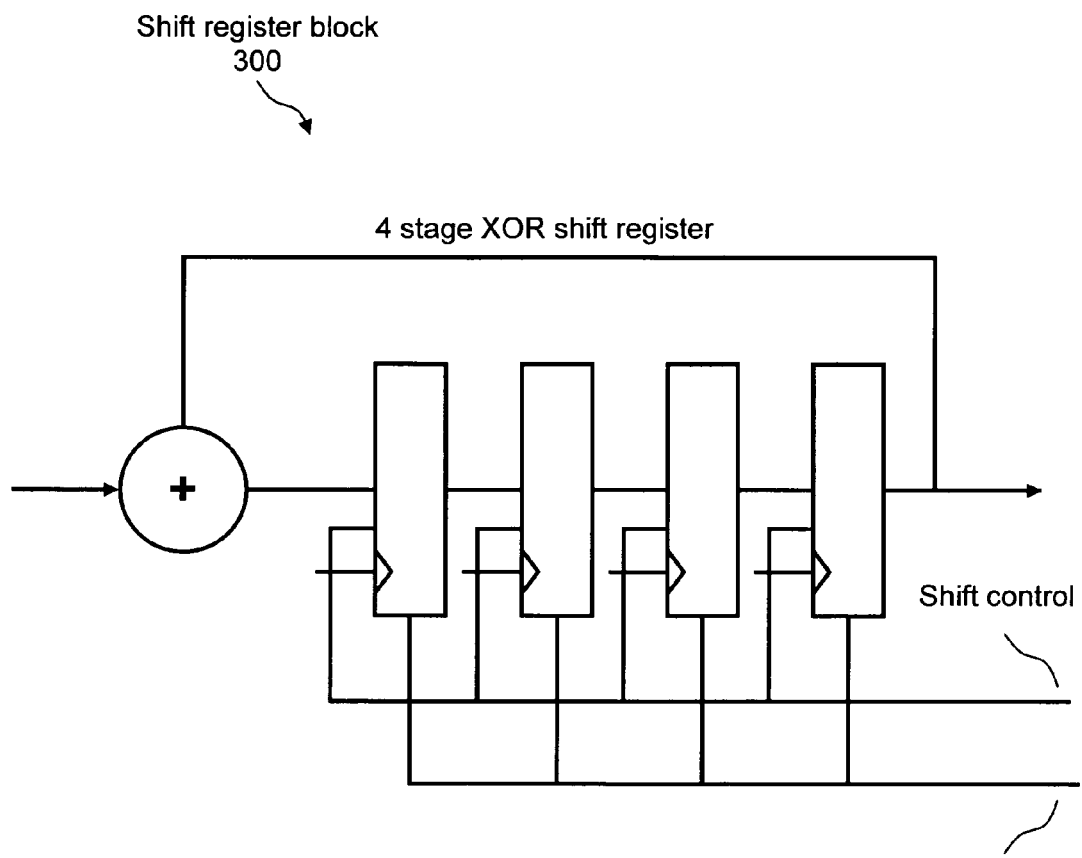
FIG. 3 is a detailed diagram of a shift register block in accordance with an exemplary embodiment of the invention.

FIG. 3 is a detailed diagram of a shift register block 300 which may be included in the XOR accumulators 210 (FIG. 2), in accordance with an exemplary embodiment of the invention. The number of stages in shift register block 300 is equal to the symbol size (in bits) divided by the XOR engine data interface size (in bits). For this example, the symbol size is 256 bits (32 bytes), and XOR engine 110 data interface is 64 bits; therefore, 256/64 is equal to 4, as is indicated by the number of stages shown in the exemplary shift register block 300.

In operation, the symbol size is chosen, such that a sector contains as many symbols as there are in a column of the RAID6 matrix. Each multi-accumulator 160 has as many XOR accumulators 210 as the number of symbols per column (16, in this example).

Disk sectors are read from cache data SDRAM 155 and presented, symbol by symbol, to all XOR accumulators 210, in concert with corresponding XOR shift enable signals read from symbol routing table 220. In this example, 4 clock cycles are required to shift one symbol to XOR accumulators 210. If enabled by its shift enable bit, the contents of any symbol within any accumulator 210 will be replaced with the result of an XOR operation on itself and the incoming symbol. Thus, after all symbols that correspond to input sector data are shifted into multi-accumulators 160a and 160b, multi-accumulators 160a and 160b each hold the desired parity or regenerated data. This data is shifted to the appropriate location in cache data SDRAM 155. For example, for the RAID6 8+2 matrix shown in Table 2, input data sectors that correspond to drives D2, D3, D4, D5, D6, D7, D8, and D9 are shifted to multi-accumulators 160a and 160b, and regenerated sectors that correspond to dead drives D0 and D1 are then shifted to SDRAM 155.

Alternatively, parity data is computed by using an RMW method in which the following input sector data is read into multi-accumulators 160 in any order: old parity data P and Q old disk data corresponding to host/dirty data, and new host/dirty data.

After all symbols that corresponds to input sector data are shifted into multi-accumulators 160a and 160b, multi-accumulators 160a and 160b each hold the updated parity data. This data is then shifted to the appropriate location in cache data SDRAM 155.

One example of RMW parity update for a RAID6 8+2 system, as shown in Table 2, is as follows:
1) Host requests write commands to sectors in D0 and D1.
2) Read old parity sector data that corresponds to D8 and D9, respectively.
3) Read old disk sector data that corresponds to host/dirty data in D0 and D1, respectively.
4) Read host/dirty data that corresponds to D0 and D1, respectively.

The updated parity data that corresponds to D8 and D9 are shifted to appropriate locations in cache data SDRAM 155.

There is no computation time required in order to generate parity or regenerate data in this architecture, because the only time consumption is the time required to shift the arguments into multi-accumulators 160 and the time to shift the results out of multi-accumulators 160, which is dictated by the interface speed.

The shift enable bits are stored in symbol routing table 220 and dictate which accumulators 210 receive the incoming symbol. The size of symbol routing table 220 is equal to MatrixSize plus two times the number of symbols per column.

In this example, multi-accumulators 160 have 16 XOR accumulators 210, and symbol routing table 220 contains compact encoding that corresponds to 16+2 RAID6 matrix. Multi-accumulators 160 can support any N+2 RAID6 configurations with 2<=N<=16. An operation for 5+2 RAID6 is processed with columns 5 to 15 as phantom columns, so no data that corresponds to these columns is read or written.

Table 4 shows an example of data organization in cache data SDRAM 155 and the order of data transfer to/from multi-accumulators 160. The upper portion of Table 4 shows an arrangement of 2 full stripes of dirty data in cache data SDRAM 155 that corresponds to an 8+2 RAID6 that has StripeDepth of 16. The lower half of Table 4 shows the order in which the 16 matrices that correspond to StripeNum 0 are processed by XOR engine 110, thus generating the corresponding P-parity data and Q-parity data.

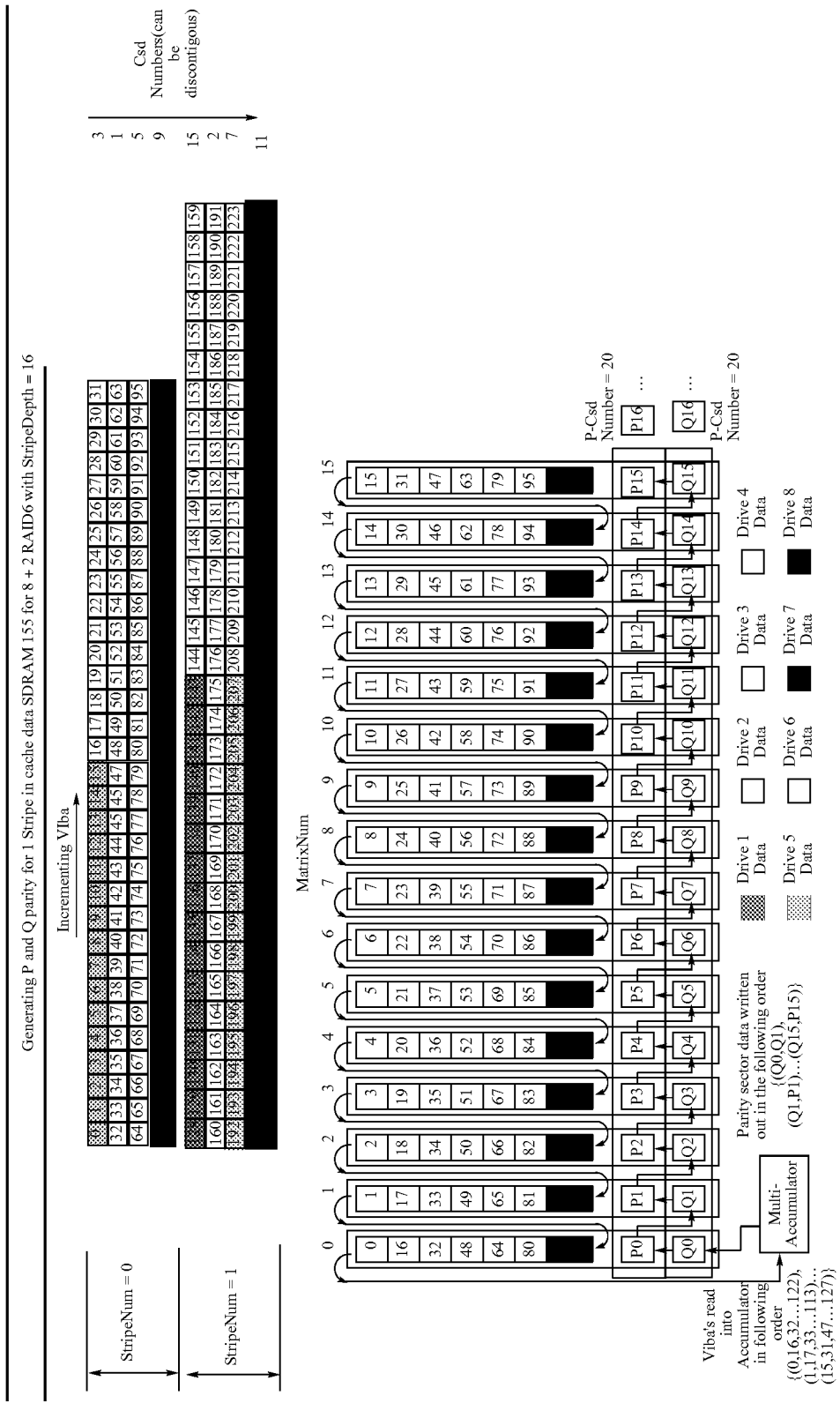
TABLE 4

8 data sectors that corresponds to MatrixNum 0 are read into XOR engine 110 from the cache segment address (CSA), which points to a block of 32 contiguous sectors located in cache data SDRAM 155. For this example, 3, 1, 5, 9, and the generated P-parity data and Q-parity data are written to sector 0 of CSA 20 and CSA 40, respectively. The same process is repeated for matrices 1 through 15, and the corresponding P and Q parity sectors are stored in consecutive sectors (1-15) in CSA 20 and 40, respectively. Data sectors that are read into XOR engine 110 may be non-contiguous in volume LBA.

In an alternate embodiment, multi-accumulator 160a or 160b may be used to calculate multiple parities or reconstitute multiple failed storage elements; however, a separate pass through the non-failed storage elements is required for each parity generation or failed storage element regeneration.

Figure 4:
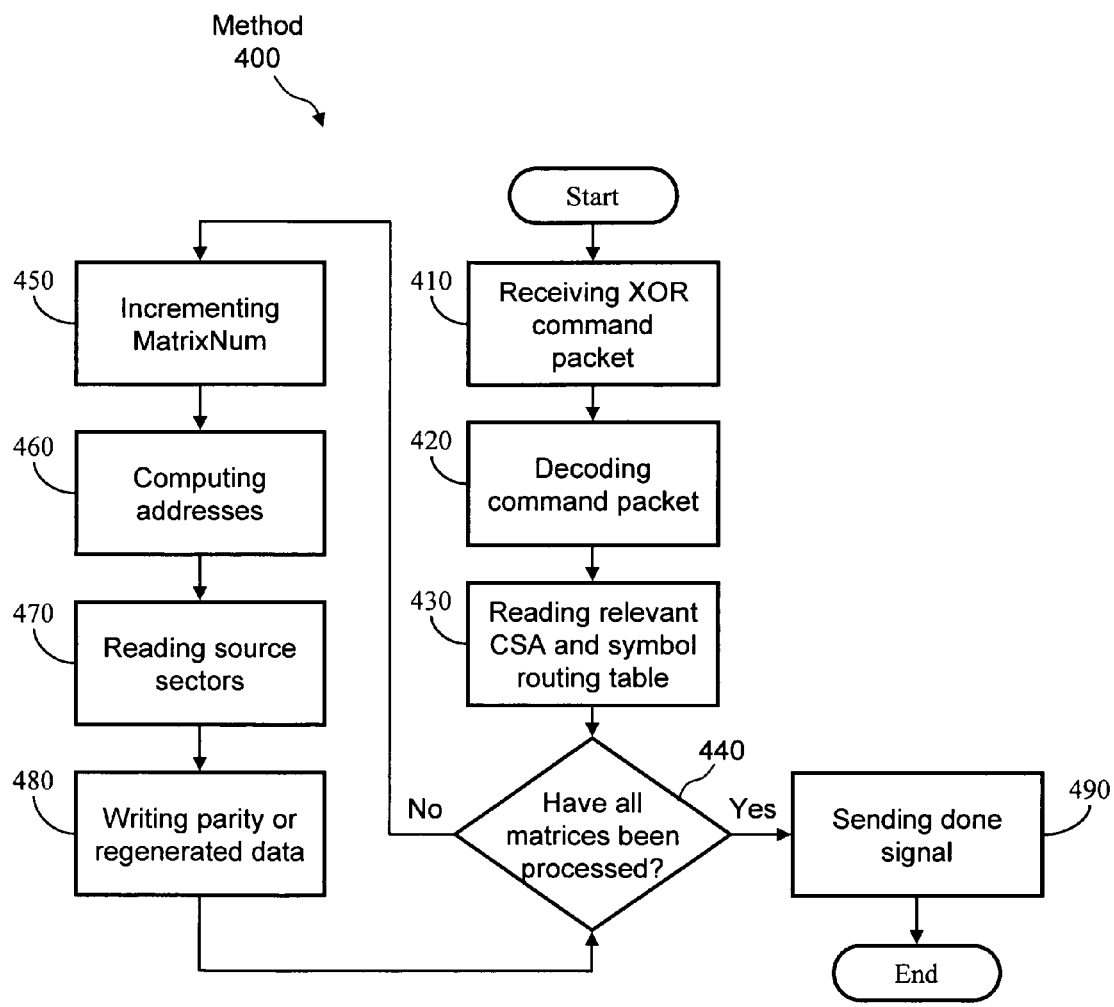
FIG. 4 is a flow diagram of processing a RAID6 XOR command in accordance with an exemplary embodiment of the invention.

FIG. 4 is a flow diagram of a method 400 of processing a RAID6 XOR command.

Step 410: Receiving XOR command packet. In this step, UDC (FCC) 130 or external micro 145 sends RAID6 XOR command packet to XOR engine 110 through CPS 135, with destination address equal to XOR engine 110, and appropriate source address (UDC 130 or external micro 145). Method 400 proceeds to step 420.

Step 420: Decoding command packet. In this step, a packet is decoded, and relevant contents are routed to work registers. Method 400 proceeds to step 430.

Step 430: Reading relevant CSA and Compact Encoding from cache data SDRAM 125. In this step,
1. Relevant CSA are read into work registers in control 175.
2. Relevant compact encoding is read into symbol routing table 220 of multi-accumulators 160, where compact encodings for various RAID6 cases are stored in the script table in SDRAM 125

Method 400 proceeds to step 440.

Step 440: Have all matrices been processed? In this decision step, method 400 determines whether all matrices in the specified range have been processed. If yes, method 100 proceeds to step 490; if no, method 400 proceeds to step 450.

Step 450: Incrementing MatrixNum. In this step, control 175 updates the current matrix pointer to the next unprocessed matrix. If the next matrix belongs to the next stripe, then StripeNum is updated and MatrixNum is reset to 0. Method 400 proceeds to step 460.

Step 460: Computing Addresses. In this step, control 175 computes source and destination addressees that correspond to sectors in the current matrix and sends them to address FIFO 151 (the source address is first followed by the destination address). Method 400 proceeds to step 470.

Step 470: Reading Source Sectors. In this step, source sectors in cache data SDRAM 155 that correspond to source addresses in address FIFO 151 are read into multi-accumulators 160a and 160b through the client interface. Method 400 proceeds to step 480.

Step 480: Writing parity or regenerated data. In this step, resulting sectors in multi-accumulators 160a and 160b are written to destinations in cache data SDRAM 155 that correspond to destination addresses in address FIFO 151. Method 400 returns to step 440.

Step 490: Sending done signal. In this step, method 400 sends a done signal to the relevant client. Method 400 ends.

It should be recognized by one skilled in the art that method 400 is a pipelined-in implementation, in which control 175 works in parallel with multi-accumulators 160a and 160b (i.e., while 160a and 160b are processing the current matrix, control 175 computes the source and destination addresses for the next matrix and also computes the address to symbol routing table 220).

The following is an example format of a RAID6 XOR command packet and its corresponding control 175 operations (processing steps and associated address computation formulae) that uses the concepts disclosed herein. The data structure format and granularity are chosen based on system design architecture and are, therefore, shown as an illustration only.

The following example illustrates how cache architecture is independent of RAID parameters (StripeDepth, NumberOfDrives, RaidType etc) and alignment of other data (non host disk data needed for parity compute or missing data re-generation) in cache data SDRAM 155, in other words, alignment of host data in cache data SDRAM 155 is managed independently of RAID parameters and scratch data (Non Host disk data).

Cache and exchange table SDRAM 125 in system 100 includes a nexus table, a MapRecords table, and a script table that includes the compact encoding for various RAID6 operations. The nexus table holds two types of nexus lists. A nexus is a list of CSAs (where a CSA is a cache segment address, which points to a block of 32 contiguous sectors located in cache data SDRAM 155). A longform nexus points to 4 MapRecords, and each MapRecord, in turn, points to sixteen CSAs; thus, a longform nexus points indirectly to 64 CSAs. A shortform nexus points to 4 CSAs. Thus, a nexus is a scatter-gather list that represents a consolidated cache data SDRAM 155 resource of either 2,048 sectors (longform nexus) or 128 sectors (shortform nexus).

The following Table 5 is an example of a packet format.

TABLE 5

RAID 6 XOR command packet format.

| # | Field | Size (Bits) | Description |
|---|---|---|---|
| 1 | Mode | 8 | Specifies RMW or Default mode & CorrectionDelta; where CorrectionDelta is a 1 bit quantity, which controls the alignment of non-host disk data in Scratch_Nexus. |
| 2 | Main_NexusPtr | 16 | Contains host data |
| 3 | Main_NexusSectorOffset | 12 | Absolute sector offset, from where relevant data begins. |
| 4 | Scratch_NexusPtr | 16 | Contains data needed to process a partial stripe or Partial matrix |
| 5 | Scratch_NexusSectorOffset | 12 | Absolute sector offset, from where relevant data begins |
| 6 | P_NexusPtr | 16 | P-parity data |
| 7 | P_NexusSectorOffset | 12 | Absolute sector offset, from where relevant data begins |
| 8 | Q_NexusPtr | 16 | Q-parity data |
| 9 | Q_NexusSectorOffset | 16 | Absolute sector offset, from where relevant data begins |
| 10 | DestinationColumnOffset1 | 8 | Will be set to 0xFF if not valid |
| 11 | DestinationColumnOffset2 | 8 | Will be set to 0xFF if not valid |
| 12 | FirstMainNexusColumnOffset | 8 | Specifies the column associated with the first sector of Host data associated with this command |

TABLE 5-continued

RAID 6 XOR command packet format.

| # | Field | Size (Bits) | Description |
|---|---|---|---|
| 13 | LastMainNexusColumnOffset | 8 | Specifies the column associated with the Last sector of Host data associated with this command |
| 14 | SkipSectorCount | 12 | |
| 15 | CommandMatrixCount | 9 | To support processing 256 matrices (corresponding to 2048 sector flush) |
| 16 | NumColumns | 8 | Specifies the number of data colums; is equal to 5 for 5 + 2 config. |
| 17 | StripeDepth | 5 | Log2 (StripeDepth) is stored here |
| 18 | ScriptNum | 10 | Specifies the appropriate Raid6 encoding in the script table in SDRAM 125. |
| 19 | Vtag__Vlba | 48 | Specifies the TAG & LBA associated with the first host data sector associated with the command |
| 20 | Ptag__Plba | 48 | Specifies the TAG & LBA associated with the first P-parity sector associated with the command |
| 21 | Qtag__Qlba | 48 | Specifies the TAG & LBA associated with the first P-parity sector associated with the command |

The following code describes how a compact RAID6 control packet works, in conjunction with hardware system 100, to generate parity and/or regenerate data.

Multi-accumulator Operation Primitives

```
Determine_Operand_NexusPtr_and_NexusSectorOffset
If(ColumnOffset = = NumColumns-2) {
        OperandNexusPtr = P_NexusPtr
        OperandNexusSectorOffset = P_NexusSectorOffset }
Else if(ColumnOffset = = NumColumns-1) {
        OperandNexusPtr = Q_NexusPtr
        OperandNexusSectorOffset = Q_NexusSectorOffset }
Else {// ColumnOffset < NumDataDrives
        OperandNexusPtr = Main_NexusPtr
        OperandNexusSectorOffset = Main_NexusSectorOffset
        If(Mode = Default) {
            If ((ColumnOffset < FirstMainNexusColumnOffset) |
                (ColumnOffset > LastMainNexusColumnOffset)) {
                    OperandNexusPtr = Scratch_NexusPtr
                    OperandNexusSectorOffset = Scratch_NexusSectorOffset }
        }
        If(Mode = RMW) {
                DirtyDataNexusPtr = Main_NexusPtr
                DirtyDataNexusSectorOffset = Main_NexusSectorOffset
                OldDataNexusPtr = Scratch_NexusPtr
                OldDataNexusSectorOffset = Scratch_NexusSectorOffset }
}
Determine_Operand_CsdListOffset_And_CsdSectorOffset
ColumnOffset_Delta = ColumnOffset;
If (ColumnOffset > = FirstMainNexusColumnOffset) && (ColumnOffset <=
LastMainNexusColumnOffset){
        ColumnOffset_Delta = ColumnOffset - FirstMainNexusColumnOffset }
If(ColumnOffset > LastMainNexusColumnOffset) {
        ColumnOffset_Delta = ColumnOffset - LastMainNexusColumnOffset +
        FirstMainNexusColumnOffset-1 + CorrectionDelta}
OperandSectorOffset = OperandNexusSectorOffset + StripSectorOffset + MatrixNum +
ColumnOffset_Delta*StripeDepth
If(ColumnOffset > = (NumColumns -2)) {
        OperandSectorOffset = OperandNexusSectorOffset + RunningMatrixNum
        }
VlbaOffset = StripSectorOffset + ColumnOffset*StripeDepth
PlbaOffset = RunningMatrixNum
OperandCsdListOffset = OperandSectorOffset >> 5
OperandCsdSectorOffset = OperandSectorOffset % 32
Generate_Matrix_Addresses_Forced_Parity_Generate_Data_Regenerate:
For(ColumnOffset = 0; (ColumnOffset < NumColumns); ColumnOffset ++)
{//Generate source addressees first
    If ((ColumnOffset != DestinationColumnOffset1) && (ColumnOffset !=
    DestinationColumnOffset2)) {
            Determine_Operand_NexusPtr_and_NexusSectorOffset( )
            Determine_Operand_NexusPtr_CsdOffset_SectorOffset ( )
            If(Csd not in LocalCsdCache) {Fetch CsdPtr from ExDram}
            Compute buffer read address & send it to DBM address FIFO}
    }
```

-continued

```
//Generate destination addressees next
If(DestinationColumnOffset1 < NumColumns) {
        ColumnOffset = DestinationColumnOffset1
        Determine_Operand_NexusPtr_and_NexusSectorOffset( )
        Determine_Operand_NexusPtr_CsdOffset_SectorOffset ( )
        If(Csd not in LocalCsdCache) {Fetch CsdPtr from ExDram}
        Compute buffer write address & save destination1 address in local register
        }
If(DestinationColumnOffset2 < NumColumns) {
        ColumnOffset = DestinationColumnOffset2
        Determine_Operand_NexusPtr_and_NexusSectorOffset( )
        Determine_Operand_NexusPtr_CsdOffset_SectorOffset ( )
        If(Csd not in LocalCsdCache) {Fetch CsdPtr from ExDram}
        Compute buffer write address & save destination2 address in local register}}
//Send computed and saved Destination address(es) to DBM address FIFO 151( if a
//Destination address was not computed because corresponding
//DestinationColumnOffset is not valid, then that destination address is not sent to DBM
//address FIFO).
Generate_Matrix_Addresses_parity_update:
//Generate addressees for reading parity & also save the addresses as write addresses
If(DestinationColumnOffset1< NumColumns) {
        ColumnOffset = DestinationColumnOffset1
        Determine_Operand_NexusPtr_and_NexusSectorOffset( )
        Determine_Operand_NexusPtr_CsdOffset_SectorOffset ( )
        If(Csd not in LocalCsdCache) {Fetch CsdPtr from ExDram}
        Compute ScratchSector buffer read address & send it to DBM address FIFO
        Save destination1 address as write address in local register
        }
If(DestinationColumnOffset2 < NumColumns) {
        ColumnOffset = DestinationColumnOffset2
        Determine_Operand_NexusPtr_and_NexusSectorOffset( )
        Determine_Operand_NexusPtr_CsdOffset_SectorOffset ( )
        If(Csd not in LocalCsdCache) {Fetch CsdPtr from ExDram}
        Compute ScratchSector buffer read address & send it to DBM address FIFO
        Save destination2 address as write address in local register
        }
//Generate addressees for old data & dirty data,
For(ColumnOffset = FirstMainNexusColumnOffset; (ColumnOffset < =
LastMainNexusColumnOffset); ColumnOffset ++)
{       Determine_Operand_NexusPtr_and_NexusSectorOffset( )
        OperandNexusPtr = DirtyDataNexusPtr
        OperandNexusSectorOffset = DirtyDataNexusSectorOffset
        Determine_Operand_NexusPtr_and_NexusSectorOffset( )
        If(DirtyCsd not in LocalCsdCache) {Fetch CsdPtr from ExDram}
        Compute DirtySector buffer read address & send it to DBM address FIFO
        OperandNexusPtr = OldDataNexusPtr
        OperandNexusSectorOffset = OldDataNexusSectorOffset
        If(ScratchCsd not in LocalCsdCache) {Fetch CsdPtr from ExDram}
        Compute ScratchSector buffer read address & send it to DBM address FIFO
}
//Sendcomputed and saved Destination address(es) to DBM address FIFO 151(if a
//Destination address was not computed because corresponding
//DestinationColumnOffset is not valid, then that destination address is not sent to DBM
//address FIFO).
Service_Request_Packet:
RunningMatrixCount =0;
MatrixNum = 0;
StripeNum = 0;
StripSectorOffset =0;
While(RunningMatrixNum < CommandMatrixCount) {
    Process_Matrix( )
    MatrixNum++
    RunningMatrixCount++
    If ((MatrixNum == StripeDepth) {
            MatrixNum = 0;
            StripeNum++
            StripSectorOffset = StripSectorOffset + SkipSectorCount }
    }
Process_Matrix :
If(Mode == Default) {
Generate_Matrix_Addresses_Forced_Parity_Generate_Data_Regenerate( ) }
Else Generate_Matrix_Addresses_parity_update( )
Symbol routing table address & Dtag_vlba (Header information to DIF engine 180)
For each Columns address:
SymbolRoutingTableAddress = ColumnOffset* (NumColumns − 2) + SectorSymbolNum
If(ColumnOffset > = (NumColumns −2)) Dtag_Vlba = Ptag_Vlba + RunningMatrixNum
Else Dtag_Vlba = Vtag_Vlba + VlbaOffset
```

The methods and systems described herein use single or dual storage element failure examples. However, it should be clear to one skilled in the art that this invention may be applied to any number of storage element failures. The matrix generation for any number of storage element failures (e.g., those greater than two) is described in U.S. patent application Ser. No. 11/266,341 entitled, "Method and system for recovering from multiple drive failures" and is hereby included by reference. Using these matrices and the desired number of multi-accumulators described herein, parity and data regeneration are computed at wire speed for the designed level of storage element failures (e.g., a four-storage-element failure case requires matrices that correspond to a four-storage-element failure and four multi-accumulators).

What is claimed as new and desired to be protected by Letters Patent of the United States is:

1. A method for generating parity symbols and for rebuilding data symbols in both RAID5 and RAID6 systems, comprising:
    receiving an XOR command packet, the XOR command packet including a command to generate a desired P parity in a RAID5 system or a desired P and Q parity in a RAID6 system or to rebuild a missing data symbol using an XOR relationship between some of a plurality of parity and data symbols;
    inputting a symbol of the plurality of parity and data symbols to an XOR accumulator hardware, the symbol being included in the XOR relationship, the XOR relationship being defined in a symbol routing table in the XOR accumulator hardware;
    inputting additional symbols of the plurality of parity and data symbols to the XOR accumulator hardware;
    each time that an additional symbol is input and is included in the XOR relationship, performing an XOR operation between the symbol in the XOR accumulator hardware and the additional symbol to obtain a resulting symbol that replaces the previous symbol in the XOR accumulator hardware; and
    after every symbol included in the XOR relationship has undergone an XOR operation, outputting the symbol in the XOR accumulator hardware as the desired parity or data symbol,
    wherein said method for generating parity symbols and rebuilding data symbols in RAID5 and RAID6 systems occurs at wire speed.

2. The method of claim 1, wherein each of the plurality of parity and data symbols is only input to the XOR accumulator hardware once in order to generate the desired parity or data symbol.

3. The method of claim 1, wherein the number of parity symbols requiring generation when a single data symbol is updated is equal in number to a desired level of parity.

4. The method of claim 1, wherein intermediate symbols are not output by the XOR accumulator hardware.

5. The method of claim 1, further comprising determining whether each of the plurality of parity and data symbols includes header information.

6. The method of claim 5, further comprising stripping the header information from each of the plurality of parity and data symbols before inputting each of the plurality of parity and data symbols to the XOR accumulator hardware.

7. The method of claim 1, further comprising using multiple XOR accumulators hardware to simultaneously generate multiple parity or data symbols.

8. An XOR engine hardware for generating a plurality of P parity symbols and P and Q parity symbols and for rebuilding a plurality of data symbols, the plurality of symbols stored on a plurality of disks in a RAID system, the XOR engine hardware comprising:
    a cache data buffer manager that manages the input and output of the plurality of symbols to and from the XOR engine hardware;
    a data integrity field engine that verifies whether each of the plurality of symbols input from the cache data buffer manager or output to the cache data buffer manager is in a correct format; and
    a plurality of multi-accumulators that each input the plurality of symbols received by the data integrity field engine from the cache data buffer manager and output a plurality of results from a plurality of XOR operations performed on the plurality of symbols, the plurality of results being output to the data integrity field engine, the plurality of results including P parity symbols for RAID5 systems, P and Q parity symbols for RAID6 systems, and rebuilt data symbols, wherein each of the plurality of multi-accumulators further comprises a symbol routing table that includes a relationship between a portion of the plurality of symbols and a plurality of XOR accumulators for performing XOR operations on the portion of the plurality of symbols according to the relationship in the symbol routing table.

9. The XOR engine hardware of claim 8, wherein the plurality of XOR accumulators in each multi-accumulator is equal in number to the number of disks in the RAID system.

10. The XOR engine hardware of claim 8, wherein the plurality of multi-accumulators is equal in number to a desired level of parity for the RAID system.

11. The XOR engine hardware of claim 8, wherein the data integrity field engine identifies a header field on some of the plurality of symbols input from the cache data buffer manager and strips the header fields from the plurality of symbols found to have header fields.

12. The XOR engine hardware of claim 8, wherein the data integrity field engine inserts a header field on each of the plurality of symbols received from the plurality of multi-accumulators.

13. A system for generating P parity and P and Q parity symbols and recovering data symbols in RAID5 and RAID6 systems, the system comprising:
    a plurality of symbols comprised of a plurality of data symbols and a plurality of parity symbols, each of the plurality of symbols stored in a RAID system; and
    at least one multi-accumulator that comprises a plurality of XOR accumulators, one XOR accumulator for each disk in the RAID system, each XOR accumulator configured to input and hold a symbol from the plurality of symbols and to perform an XOR operation between the held symbol and a subsequently input symbol from the plurality of symbols if both the held symbol and the subsequently input symbol are included in a predefined relationship in a symbol routing table of the at least one multi-accumulator, the relationships defining the generation of P parity in RAID5 systems and P and Q parity in RAID6 systems and the recovery of missing data symbols.

14. The system of claim 13, wherein the at least one multi-accumulator is configured to find a parity symbol from the plurality of symbols.

15. The system of claim 13, wherein the at least one multi-accumulator is configured to rebuild a data symbol from a plurality of symbols.

16. The system of claim 13, wherein the at least one multi-accumulator is a plurality of multi-accumulators equal in number to a desired level of parity for the RAID system.

17. The system of claim 13, further comprising a data integrity field engine that verifies whether each of the plurality of symbols input to or from the at least one multi-accumulator is in a correct format.

18. The system of claim 13, wherein the data integrity field engine identifies a header field on some of the plurality of symbols input to the at least one multi-accumulator and strips the header fields from the plurality of symbols found to have header fields.

19. The system of claim 13, wherein the data integrity field engine inserts a header field on each of the plurality of symbols received from the at least one multi-accumulator.

* * * * *